(12) United States Patent
Metzech et al.

(10) Patent No.: US 8,864,077 B2
(45) Date of Patent: Oct. 21, 2014

(54) METHOD FOR CONNECTING A FIRST MATERIAL TO A SECOND MATERIAL IN AIRCRAFT CONSTRUCTION

(75) Inventors: Sabine Metzech, Delmenhorst (DE); Georg Wachinger, Rosenheim (DE); Thomas Meer, Egmating (DE); Christian Lammel, Ismaning (DE)

(73) Assignee: Airbus Operations GmbH, Hamburg (DE)

( * ) Notice: Subject to any disclaimer, the term of this patent is extended or adjusted under 35 U.S.C. 154(b) by 891 days.

(21) Appl. No.: 12/682,455

(22) PCT Filed: Oct. 13, 2008

(86) PCT No.: PCT/EP2008/008664
§ 371 (c)(1),
(2), (4) Date: Mar. 18, 2011

(87) PCT Pub. No.: WO2009/047010
PCT Pub. Date: Apr. 16, 2009

(65) Prior Publication Data
US 2011/0284691 A1  Nov. 24, 2011

Related U.S. Application Data

(60) Provisional application No. 60/979,493, filed on Oct. 12, 2007.

(30) Foreign Application Priority Data

Oct. 12, 2007  (DE) .......................... 10 2007 000 862

(51) Int. Cl.
*B64C 1/06* (2006.01)
*B29C 65/00* (2006.01)
(Continued)

(52) U.S. Cl.
CPC .............. *B29C 66/47* (2013.01); *B29C 65/344* (2013.01); *B29C 66/91221* (2013.01);
(Continued)

(58) Field of Classification Search
USPC ............ 244/131–133, 119; 156/272.2, 273.9, 156/274.2, 275.5, 276, 379.7; 219/617
See application file for complete search history.

(56) References Cited

U.S. PATENT DOCUMENTS 3,845,268 A * 10/1974 Sindt .............................. 219/661
3,996,402 A * 12/1976 Sindt .............................. 428/140

(Continued)

FOREIGN PATENT DOCUMENTS

DE  1479212 A1  3/1970
DE  3505115 A1  8/1986

(Continued)

OTHER PUBLICATIONS

International Searching Authority, International Search Report, International Application No. PCT/EP2008/008664, dated Sep. 14, 2009 (5 pages).

(Continued)

*Primary Examiner* — Philip J Bonzell
(74) *Attorney, Agent, or Firm* — Ingrassia Fisher & Lorenz, P.C.

(57) ABSTRACT

The invention concerns a method of connecting a first material to a second material by means of a heat-activatable adhesive material (8) in aircraft construction, wherein the adhesive material (8) is arranged between the first material and the second material and an induction heat which is adequate to activate the adhesive material (8) is generated. The first material and/or the second material and/or the adhesive material (8) have an induction heat-generating means. The induction heat-generating means is a non-woven metallic mesh and/or the induction heat-generating means (53) has an amount of carbon fibers for induction heat generation. The invention further concerns an apparatus comprising a first material and a second material, wherein the first material and the second material have a connection which can be produced by a heat-activatable adhesive material arranged between the first material and the second material, in accordance with the method in accordance with the invention.

10 Claims, 7 Drawing Sheets

Figure 1:
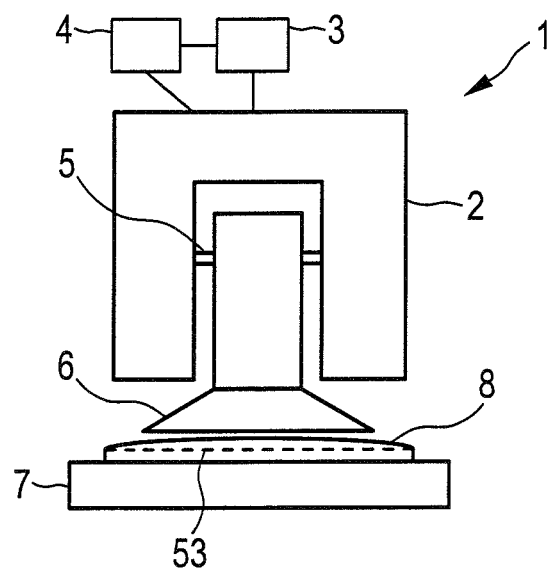

(51) Int. Cl.
  B29C 65/50 (2006.01)
  C09J 5/06 (2006.01)
  B29C 65/36 (2006.01)
  C08J 5/12 (2006.01)
  B29C 65/78 (2006.01)
  B29C 65/34 (2006.01)
  B29K 307/00 (2006.01)
  B29C 65/48 (2006.01)
  B29L 31/30 (2006.01)
  B29K 309/08 (2006.01)
  B29K 305/00 (2006.01)

(52) U.S. Cl.
  CPC ....... *B29C 66/7212* (2013.01); *B29C 66/91411* (2013.01); *B29K 2307/00* (2013.01); *B29C 65/3444* (2013.01); *B29C 65/5057* (2013.01); *B29C 66/91651* (2013.01); *B29C 66/91216* (2013.01); *B29C 66/90* (2013.01); *C09J 2400/226* (2013.01); *B29C 65/4815* (2013.01); *C09J 5/06* (2013.01); *B29C 66/721* (2013.01); *B29C 65/3676* (2013.01); *B29C 65/3492* (2013.01); *B29L 2031/3082* (2013.01); *C08J 5/121* (2013.01); *B29C 66/80* (2013.01); *B29C 65/364* (2013.01); *B29C 65/3612* (2013.01); *B29C 65/3644* (2013.01); *B29C 65/7841* (2013.01); *B29C 65/3476* (2013.01); *B29C 65/3684* (2013.01); *B29C 65/5028* (2013.01); *C09J 2400/163* (2013.01); *B29K 2309/08* (2013.01); *B29C 66/8181* (2013.01); *B29K 2305/00* (2013.01)
  USPC ...................................... 244/131; 156/272.2

(56) References Cited

U.S. PATENT DOCUMENTS

| | | | |
|---|---|---|---|
| 4,313,777 A * | 2/1982 | Buckley et al. | 156/272.2 |
| 4,969,968 A | 11/1990 | Leatherman | |
| 5,225,025 A * | 7/1993 | Lambing et al. | 156/358 |
| 5,313,034 A * | 5/1994 | Grimm et al. | 219/765 |
| 5,313,037 A * | 5/1994 | Hansen et al. | 219/632 |
| 5,340,428 A * | 8/1994 | Kodokian | 156/272.2 |
| 5,481,091 A * | 1/1996 | Grimm et al. | 219/633 |
| 5,486,684 A * | 1/1996 | Peterson et al. | 219/633 |
| 5,587,098 A * | 12/1996 | Matsen et al. | 219/615 |
| 5,832,594 A | 11/1998 | Avila | 29/798 |
| 6,221,195 B1 | 4/2001 | Lubert et al. | |
| 6,284,089 B1 | 9/2001 | Anderson et al. | 156/304.3 |
| 7,080,805 B2 * | 7/2006 | Prichard et al. | 244/117 R |
| 7,371,303 B2 | 5/2008 | Schmitt | |
| 8,156,711 B2 * | 4/2012 | Hethcock et al. | 52/790.1 |

FOREIGN PATENT DOCUMENTS

| | | |
|---|---|---|
| DE | 19809264 A1 | 9/1999 |
| DE | 102006058935 A1 | 2/2008 |
| DE | 10032817 B4 | 2/2010 |

OTHER PUBLICATIONS

International Searching Authority, International Search Report, International Application No. PCT/EP2008/008664, dated Sep. 14, 2009 (4 pages) [English Translation].

International Searching Authority, Written Opinion, International Application No. PCT/EP2008/008664, dated Sep. 14, 2009 (8 pages).

The International Bureau of WIPO, International Preliminary Report on Patentability (including the Written Opinion of The International Searching Authority)—International Application No. PCT/EP2008/008664, dated Apr. 13, 2010 (9 pages).

The International Bureau of WIPO, International Preliminary Report on Patentability (including the Written Opinion of the International Searching Authority [English Translation])—International Application No. PCT/EP2008/008664, dated May 11, 2010 (13 pages).

German Patent and Trade Mark Office, German Office Action for German Patent Application No. 10 2007 000 862.9, mailed Jul. 31, 2008.

\* cited by examiner

0°  90°  -45°  +45°  +45°  -45°  90°  0° sewing in the Z-direction with C-fiber roving

METHOD FOR CONNECTING A FIRST MATERIAL TO A SECOND MATERIAL IN AIRCRAFT CONSTRUCTION

The invention concerns a method of connecting a first material to a second material in aircraft construction. The invention further concerns an apparatus for carrying out the method and an apparatus including the first material and the second material.

In aircraft construction a first material, for example a thermoplastic material, is frequently connected to a second material, for example a fiber composite material, by means of a mechanical fixing, in particular by means of screws, or by adhesive. For example plastic holders which have thermoplastic material are frequently connected to components such as for example a side cladding or an overhead locker which have fiber composite material within a pressurisable area, for example a cabin area of an aircraft.

Gluing plastic holders which have thermoplastic material to components which have fiber composite material requires very complicated and expensive pretreatment of the adhesive surfaces of the plastic holders. The surfaces first have to be roughened up and thereafter pretreated with a primer. It is only after that pretreatment that the plastic holders can be glued to the components. It is then necessary to wait for a certain time, generally between five and eight hours, until the adhesive has hardened and has the necessary initial adhesive strength. Frequently adhesives which are heat-hardening are also used. When using such adhesives the plastic holders and components which are to be joined together have to be hardened for up to 48 hours in an oven. The adhesive procedure is therefore very complicated and time-intensive.

Alternatively or additionally plastic holders which have thermoplastic material are frequently fixed by means of screws to components which have fiber composite material. It will be noted however that this involves the disadvantage that the size and position of the bores for the screws must already be known during production of the plastic holders and the components and that upon a change in the fixing position new bores have to be produced in the components and/or the plastic holders. That is a disadvantage in regard to the entire production process.

The object of the present invention is to provide a method of connecting a first material to a second material in aircraft construction, which is less complicated and expensive and time-intensive than known adhesive methods and which in comparison with a mechanical fixing procedure such as for example by means of screws simplifies a change in the connecting position of the first material relative to the second material. A further object of the present invention is to provide an apparatus which can be produced by means of the method.

That object is attained by a method of connecting a first material to a second material by means of a heat-activatable adhesive material in aircraft construction, wherein the adhesive material is arranged between the first material and the second material and an induction heat which is adequate to activate the adhesive material is generated, wherein the first material and/or the second material and/or the adhesive material have an induction heat-generating means and the induction heat-generating means is a non-woven metallic mesh.

The expression 'activation of the adhesive material' includes activation of the adhesive material such that the period of time required to connect the first material and the second material together is shortened. By way of example activation of the adhesive material provides that that period is reduced from several hours to a few minutes or a few seconds.

In addition the expression 'activation of the adhesive material' includes the point that prior to activation of the adhesive material the adhesive material preferably has no or only weak adhesive properties which are not adequate to connect the first material and the second material together. The expression 'activation of the adhesive material' therefore preferably includes activations, the result of which is that the first material and the second material are more quickly connected together and/or it is only by activation that adhesive properties are produced, which are sufficient to connect the first material and the second material together. In that respect the adhesive material is preferably an adhesive material which is not solvent-based.

As generation of the induction heat and activation of the adhesive material, caused by the induction heat, take place very quickly, the method according to the invention reduces the time required for connecting the materials very greatly, in comparison with other methods known in aircraft construction. In particular it is only a few minutes. In addition no bores are required in the materials, whereby a change in the connecting position of the one material relative to the other material is simplified.

It is preferred that the first material and/or the second material have at least one material from a group consisting of plastic materials, in particular thermoplastic materials, fiber composite materials, in particular carbon fiber-reinforced plastics and glass fiber-reinforced plastics, metals and fiber metal laminates (FML), for example GLARE. The metals are preferably Al, Mg, Ti, steel and high-quality steel. The first material and the second material can respectively have a material or a plurality of materials of the above-indicated group. In that respect the first material and the second material may have the same materials but also different materials. In addition only the first material or the second material may have one or more materials from the above-indicated group. The expression 'have' also embraces the expression 'comprise', in other words the first material and/or the second material may have at least one material from the above-indicated group exclusively or besides further materials.

Additionally or alternatively other metallic materials, in particular metallic nanoparticles, preferably nanoferrites can be used as induction heat-generating means.

If the first material and/or the second material have the induction heat-generating means, a connection according to the invention is possible without an induction heat-generating means having to be introduced into the adhesive material, wherein the time required for making the connection according to the invention is further reduced.

It is further preferred that the non-woven metallic mesh is a slit and stretched metal element. In particular the preferred non-woven metallic mesh is preferably produced by slitting and stretching a metal sheet or a metal film. It is possible to use for example the non-woven metallic meshes produced by Astrostrike or Dexmet. In a preferred embodiment the non-woven metallic mesh is produced by slits being introduced portion-wise into a metallic film, in particular to produce special slit patterns, and then the metallic film is stretched in the x- and y-directions. The x-direction and y-direction preferably define two mutually perpendicular directions which are in the plane of the film.

The use of a non-woven metallic mesh, in particular a slit or stretched metal element, has the advantage that induction heat can be generated by means of medium-frequency radiation.

In addition or alternatively in a further preferred embodiment the induction heat-generating means can be a metal coating arranged inside or externally on the first material and/or the second material, as the induction heat-generating means.

It is further preferred if the induction heat is generated by medium-frequency radiation, in particular in a frequency range of between 10 and 50 kHz. Alternatively induction heat can also be generated by means of high-frequency radiation, in which case the frequency is preferably a plurality of MHz.

Apparatuses for generating medium-frequency radiation can be produced smaller and more manageably than apparatuses for producing high-frequency radiation. The preferred use of medium-frequency radiation therefore makes it possible to carry out the method according to the invention with small and conveniently handleable items of equipment so that the expenditure in terms of carrying out the method according to the invention is further reduced.

It is also preferred that a) the first material is a constituent part of a fixing element or the fixing element comprises the first material, and b) the second material is a constituent part of an aircraft component or the aircraft component comprises the second material, so that the first material of the fixing element is connected to the second material of the aircraft component to connect the fixing element to the aircraft component. The fixing element is in particular a holder, in which case the holder in particular has a thermoplastic material or is made therefrom, in particular thermoplastic material. The aircraft component preferably includes or comprises plastic material, in particular fiber composite plastics, and/or metals. The first material and/or the second material can therefore also be hybrid materials which have both plastic materials and also metals.

That makes it possible to produce a connection between a fixing element, in particular a holder, and an aircraft component, quickly, reliably and in a simple fashion.

The aircraft component is in particular a side cladding in an aircraft, in particular in a pressurisable space in the aircraft, and/or an overhead locker of the aircraft or a part of the side cladding and/or a part of the overhead locker.

The method according to the invention is preferably carried out within an aircraft, in particular within a space in an aircraft, which is pressurisable in operation. A fixing element arrangement comprising a fixing element, in particular a holder, and an aircraft component, is therefore preferably arranged within an aircraft, preferably within a space in the aircraft, which is pressurisable in operation. Alternatively the method however can also be carried out in other areas of an aircraft, for example in the region of the fuselage interior and/or a wing.

The invention further relates to a method of connecting a first material to a second material by means of a heat-activatable adhesive material in aircraft construction, wherein the adhesive material is arranged between the first material and the second material and an induction heat is generated which is sufficient to activate the adhesive material, wherein the first material and/or the second material and/or the adhesive material have an induction heat-generating means, wherein the induction heat-generating means is or has an amount of carbon fibers.

The induction heat-generating means is in particular a carbon fiber-reinforced plastic, in particular in a layer structure, further preferably in particular a carbon fiber laminate (CFRP).

Particularly if a carbon fiber-reinforced plastic is used as the first and/or second material or the first material and/or the second material have such a carbon fiber-reinforced plastic the induction heat can be generated in that material. There is therefore no need to introduce further induction heat-generating means into the adhesive material or into the first or second material, whereby the method according to the invention is further simplified.

It is preferred if the first material and/or the second material is a carbon fiber-reinforced plastic material in a layer structure or has a carbon fiber-reinforced plastic in a layer structure, wherein the layer structure has a plurality of layers with the carbon fibers and the carbon fibers of the carbon fiber-reinforced plastic are the induction heat-generating means.

It is also preferred if the carbon fibers in at least some layers are unidirectionally oriented, wherein the carbon fibers of at least two adjacent layers are not arranged parallel so that the carbon fibers of the at least two adjacent layers have intersection points.

In an embodiment the carbon fibers are unidirectionally oriented in each layer.

In a further embodiment the carbon fibers in at least some layers are not unidirectionally oriented, wherein the carbon fibers of at least two adjacent layers are not arranged parallel so that the carbon fibers in at least two adjacent layers have intersection points.

In an embodiment the carbon fibers are not unidirectionally oriented in each layer.

Layer structures having the above-mentioned intersection points facilitate generation of an induction heat adequate for activation of the adhesive material.

In a further preferred embodiment the adhesive fibers in at least one layer form a woven material. In an embodiment the carbons in each layer form a woven material.

It is further preferred if the layers are sewn together by means of carbon fibers, that is to say with further carbon fibers. It is also preferred if the layers are sewn together by means of carbon fibers in a direction perpendicularly to the planes in which the layers are arranged. The carbon fibers used for the sewing effect can also be used as induction heat-generating means and further facilitate generation of an induction heat adequate for activation of the adhesive material.

It is further preferred if the orientation of the carbon fibers in the layers is symmetrical relative to a plane of symmetry which is arranged parallel to the layers and in relation to a direction perpendicularly to the layers centrally in the layer structure. Stresses which are possibly present in the layer structure can be reduced or eliminated thereby.

In addition it is preferred if, besides the carbon fibers of the carbon fiber-reinforced plastic, which can also possibly include carbon fibers used for sewing, no further induction heat-generating means is used for generating the induction heat. As preferably no further induction heat-generating means is required for generating the induction heat, the gluing method is simplified.

It is further preferred if the first material and/or the second material have at least one material from a group consisting of carbon fibers, in particular thermoplastic materials, fiber composite plastics, in particular carbon fiber-reinforced plastics and glass fiber-reinforced plastics, metal and fiber metal laminates.

It is further preferred if the induction heat is generated by means of medium-frequency radiation.

The invention further relates to an apparatus including a first material and a second material, wherein the first material and the second material have a connection which can be produced by a heat-activatable adhesive material arranged between the first material and the second material, as set forth in one of claims 1 through 5 or one of claims 6 through 15.

Preferred embodiments of the apparatus are recited in the appendant claims.

Furthermore the invention also concerns a method of connecting a first material to a second material by means of a heat-activatable adhesive material in aircraft construction, wherein the adhesive material is arranged between the first material and the second material and an induction heat is generated which is adequate to activate the adhesive material, wherein the first material and/or the second material and/or the adhesive material have an induction heat-generating means and the induction heat-generating means has a non-woven metallic mesh and an amount of carbon fibers for induction heat generation, wherein preferred arrangements of the carbon fibers are defined in claims 7 through 12.

Figure 2:
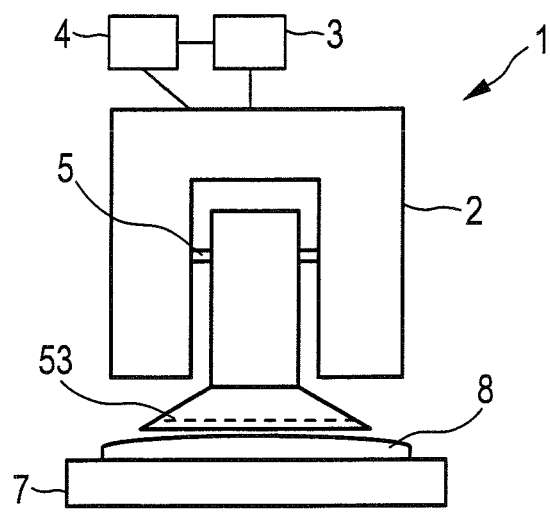
Figure 3:
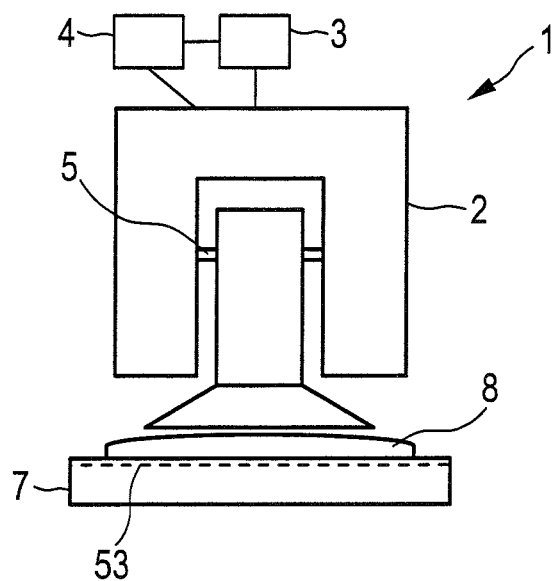
Figure 4:
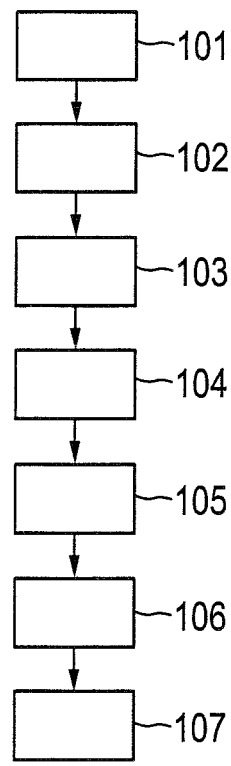
Figure 5:
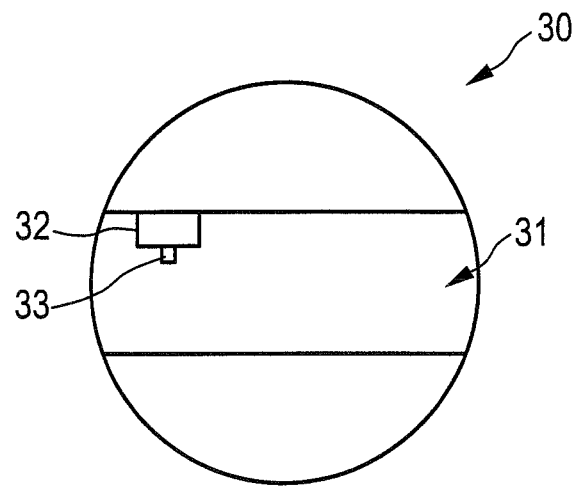
Figure 6:
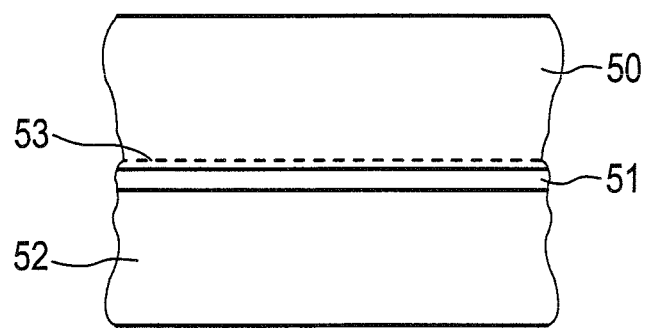
Figure 7:
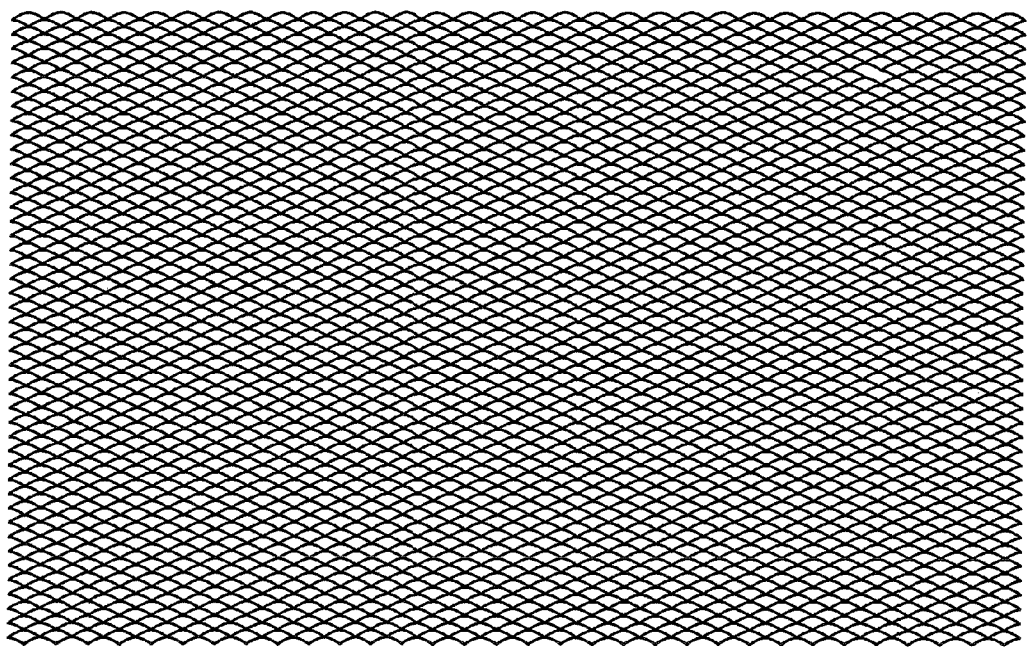
Figure 8:
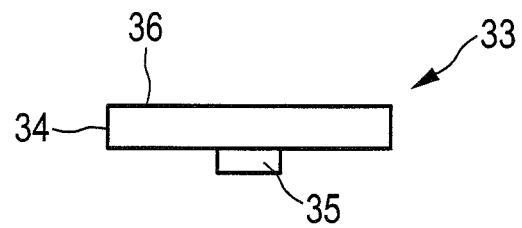
Figure 9:
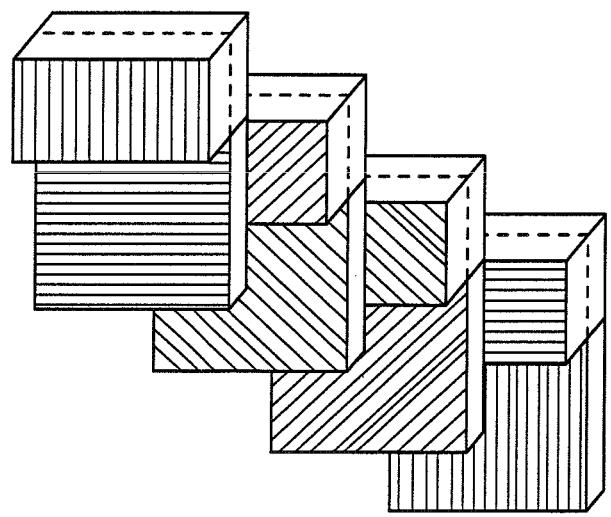
Figure 10:
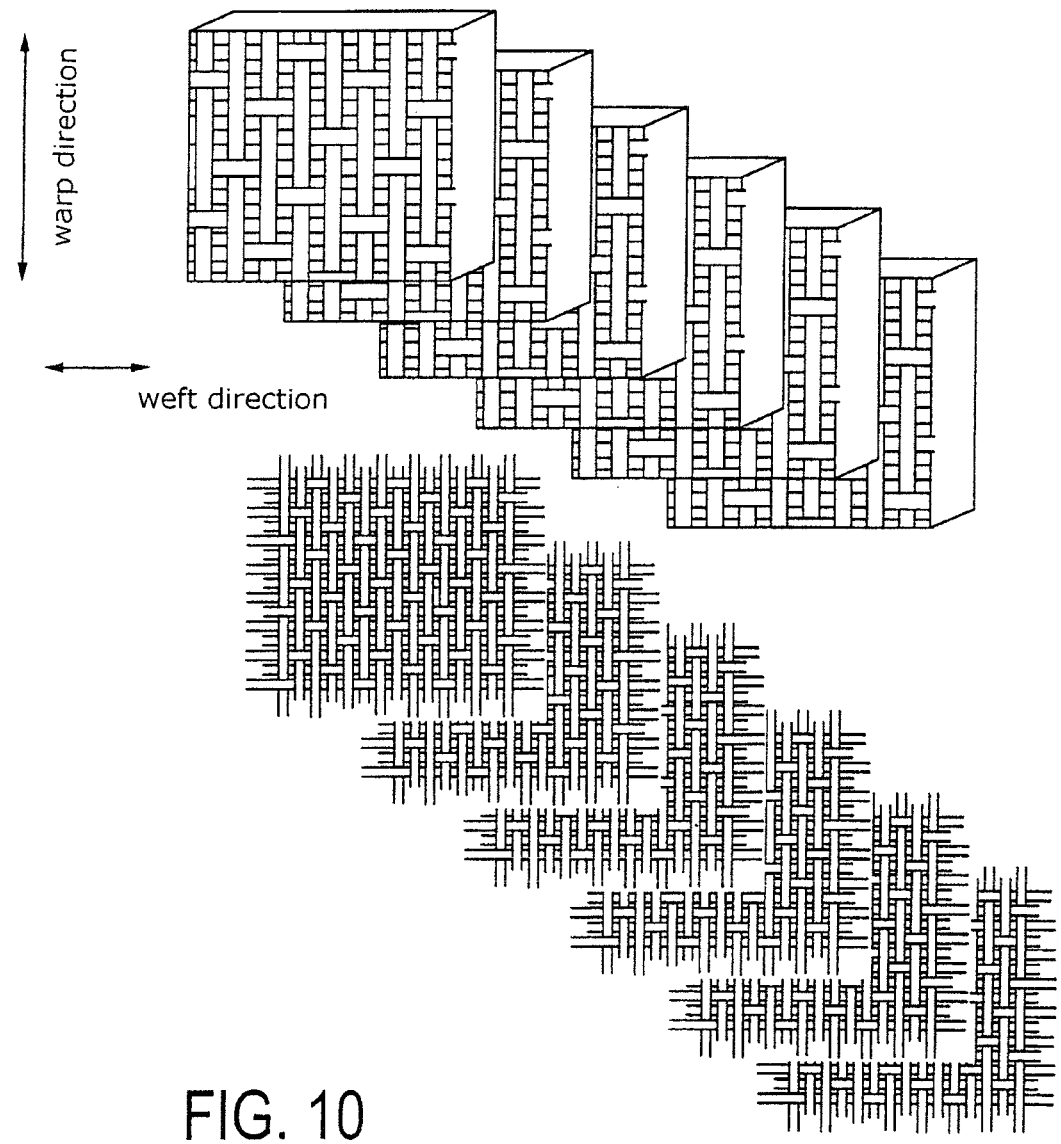
Figure 11:
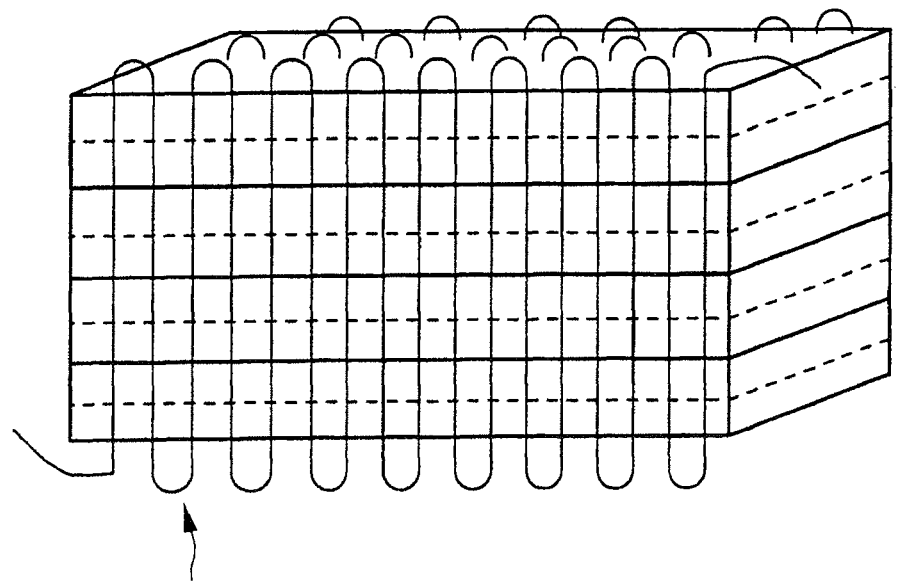

Preferred embodiments of the invention are described in greater detail hereinafter with reference to a drawing in which:

FIG. 1 shows a diagrammatic view of an embodiment of an apparatus for connecting a first material to a second material, wherein an induction heat-generating means is arranged in a connecting region between the first material and the second material, FIG. 2 shows a diagrammatic view of an embodiment of an apparatus for connecting a first material to a second material, wherein an induction heat-generating means is arranged in the first material, FIG. 3 shows a diagrammatic view of an embodiment of an apparatus for connecting a first material to a second material, wherein an induction heat-generating means is arranged in the second material, FIG. 4 shows a flow chart of an embodiment of a method according to the invention of connecting a first material to a second material, FIG. 5 shows a diagrammatic view of an aircraft with a cabin space in which there is arranged a fixing element arrangement having an aircraft component and a fixing element, FIG. 6 diagrammatically shows a connecting region, FIG. 7 shows a diagrammatic view of an induction heat-generating non-woven metallic mesh, FIG. 8 shows a diagrammatic cross-sectional view of a holder, and FIGS. 9 through 11 show diagrammatic views of various layer structures of a carbon fiber-reinforced plastic.

FIG. 1 shows a diagrammatic view of an apparatus for connecting a first material to a second material.

The apparatus 1 for connecting a first material to a second material has an inductor 2 for generating electromagnetic radiation. In this embodiment the inductor 2 is of such a configuration that it generates a medium-frequency radiation. In other embodiments the inductor can also be of such a configuration that it generates electromagnetic radiation in other frequency ranges, for example in the high-frequency range.

The apparatus 1 for connecting a first material to a second material further includes a control unit 3 connected to the inductor 2 for controlling the inductor 2. In particular the frequency and amplitude of the electromagnetic radiation generated can be controlled by means of the control unit 3. In addition preferably the time duration of generation of the electromagnetic radiation can also be controlled by means of the control unit 3.

The inductor 2 has one or more fixing elements 5 which are so adapted that they can hold a first material which in this embodiment is a material of a holder 6. The fixing element 5 can be of differing configurations. For example the fixing element 5 can form a force-locking connection, for example by wedging, clamping or screwing. The fixing element 5 however can also form a positively locking connection to the first material or a connection involving intimate joining thereto. The fixing element 5 is adapted to the shape and nature of the respective first material. In other embodiments the inductor may also not have a fixing element for holding the first material, in which case then during the adhesive procedure the inductor is preferably urged in the direction of the adhesive region to bring the first material and the second material together and to hold them together during the adhesive procedure.

The apparatus 1 for connecting a first material to a second material further has a cooling unit 4 for cooling the connecting region and in particular the inductor 2. The cooling unit 4 preferably uses compressed air and/or water which is passed into the connecting region and in particular into the inductor 2 to cool them. In the embodiment the cooling unit 4 is also connected to the control unit 3 so that cooling of the connecting region and in particular the inductor 2 can also be controlled by means of the control unit 3.

In the FIG. 2 example the second material is also a fiber composite plastic 7 which is to be connected to the holder 6 by means of a heat-activatable adhesive material 8. The fiber composite plastic 7 is in particular a fiber composite plastic 7 of an aircraft component. The heat for activation of the adhesive material is generated by means of a non-woven metallic mesh 53 by current being generated by the inductor, and thus heat, in the non-woven metallic mesh 53. The non-woven metallic mesh 53 is arranged in or in the proximity of the connecting region in such a way that an induction heat is generated in the connecting region, which is adequate to activate the heat-activatable adhesive material 8. In this case the non-woven metallic mesh can be arranged in the connecting region, as shown in FIG. 1, and/or in a part of the first material, that is towards the connecting region, in particular part of the holder 6, as is shown in FIG. 2, and/or in a region of the second material 7, that is towards the connecting region, as is shown in FIG. 3.

The heat-activatable adhesive material 8 can be for example a reactive adhesive which has epoxy and/or polyurethane and/or acrylate and/or imides and/or silicone. The heat-activatable adhesive material can also have or comprise hot melts, in particular reactive hot melts. Preferred hot melts are all thermoplastic hot melts, in particular polyolefins, polyesters, polyamides, polyether imides, polyether sulfones and polyether ketones. The heat-activatable adhesive material 8 has or comprises preferably at least one of those materials.

The control unit 3 and the inductor 2 are preferably so adapted that a heat can be generated in the connecting region, which is adequate to activate the heat-activatable adhesive material. For example in the case of epoxy resin-based two-component paste adhesives a temperature of between 50 and 200° C. is generated in the connecting region. If PU-based two-component paste adhesives are used as the adhesive material a temperature of for example between 40 and 200° C. is generated in the connecting region. When using one-component epoxy resin adhesives in addition for example a temperature of between 100 and 250° C. is generated in the connecting region.

A thermoelement which is incorporated in the apparatus 1 and in particular in the inductor 2 or an external pyrometer can be used for monitoring the temperature in the connecting region.

In another embodiment the apparatus can be adapted to generate heat for activation of the adhesive material by means of carbon fibers, by currents being generated by the inductor, and thus heat in the carbon fibers.

An embodiment according to the invention of a method of connecting a first material to a second material in aircraft construction is described hereinafter with reference to the flow chart shown in FIG. 4.

In step 101 the holder 6 is introduced into the inductor 2 and fixed to the inductor 2 by means of the fixing elements 5. Then in step 102 a surface of the second material 7 which is to be connected to the first material and/or a surface of the first material 6 which is to be connected to the second material is provided with the heat-activatable adhesive material. In other embodiments the first material and/or the second material could already be provided with the adhesive material 8 so that in that case it would be possible to dispense with step 102. If the first material and/or the second material have already been provided with an adhesive material then that adhesive material is preferably a material which is reactive or has adhesive properties only upon being heated, in particular a hot melt adhesive material and which in particular has no adhesive properties at ambient temperature.

In step 103 a non-woven metallic mesh 53 is placed on a side of the first material or the second material, that is provided with the adhesive material 8. If in other embodiments the non-woven metallic mesh is arranged in the first material, for example as shown in FIG. 2, and/or in the second material, as shown for example in FIG. 3, it is possible to dispense with step 103. Also if the adhesive material already has induction heat-generating elements such as for example metallic particles it is possible to dispense with step 103. Instead of the non-woven metallic mesh in other embodiments it is also possible to use other induction heat-generating means such as for example metallic nanoparticles or nanoferrites. Furthermore it is possible to dispense with the step 103 if carbon fibers of the first and/or second material are used as the induction heat-generating means. Alternatively those carbon fibers as the induction heat-generating means can also be used together with the non-woven metallic mesh 53.

In step 104 the inductor is placed with the first material, in this embodiment with the holder 6, on the second material 7. In that case the inductor 2 can be held manually with the holder 6 on the second material 7. In other embodiments the inductor 2 can also have holding elements which hold the inductor 2 with the holder 6 on the second material 7 during the connecting procedure. Those holding elements could be for example self-adhesive elements such as for example suction cups.

Then in step 105 electromagnetic radiation is generated by means of the control unit 3 by the inductor 2 in such a way that induction heat is produced, which generates a heat in the connecting region, that is adequate the adhesive material 8 in such a way that adhesive properties are produced, which are adequate to connect the first material and the second material together. Preferably heating is monitored by way of a thermoelement which can be integrated in the inductor and/or an external pyrometer. The parameters for generation of the electromagnetic radiation by the inductor 2 can be adjusted and/or altered for example prior to and/or during generation of the heat. The parameters, for example the frequency and amplitude of the electromagnetic radiation and the duration of heat generation can be set at the control unit 3 at any moment in time prior to the beginning of the operation of generating the electromagnetic radiation so that to start the generation of the electromagnetic radiation, it is only necessary to activate that process.

After the adhesive material 8 has been activated as described above, in step 106 generation of electromagnetic radiation by the inductor 2 is stopped by means of the control unit 3 and the connecting region is cooled by means of the cooling unit 4. Preferably the cooling unit 4 also cools the inductor 2.

After the cooling phase in step 107 the fixing element 5 is released from the holder 6 and the inductor 2 is removed, with the first and second materials being connected together.

FIG. 5 is a diagrammatic view of an embodiment of an apparatus 30 according to the invention including a first material and a second material.

The apparatus 30 is an aircraft, FIG. 5 diagrammatically showing a cross-sectional view through the aircraft fuselage. The aircraft 30 has a cabin area 31 which is pressurisable in operation and in which there is arranged an aircraft component 32 which has a fiber composite material, in particular a fiber composite plastic material (FCP material). The aircraft component 32 is connected to a holder 33 which has or comprises thermoplastic material. The connection between the aircraft component 32 and the holder 33 forms a fixing arrangement and can be produced by the above-described method according to the invention.

In this embodiment the aircraft component 32 has a non-woven metallic mesh, in particular a non-woven metallic mesh from Astrostrike or Dexmet. That non-woven metallic mesh was used during fixing of the holder 33 to the aircraft component 32 for generating the induction heat which is sufficient to activate the adhesive material disposed between the holder 33 and the aircraft component 32.

In another embodiment the aircraft component 32 has no non-woven metallic mesh, in particular if the carbon fibers are used for producing the induction heat.

In an embodiment the apparatus for connecting a first material to a second material can use carbon fibers of the first material and/or of the second material as the induction heat-generating means, in which case the non-woven metallic mesh 53 is not necessarily used but only optionally, in particular to further increase the induction heat.

The connecting region is shown diagrammatically and an on an enlarged scale in FIG. 6. FIG. 6 shows a portion 50, that is towards the connecting region, of the aircraft component 32, a portion 52, that is towards the connecting region, of the holder 33, and a connecting layer 51 formed by the adhesive material. Arranged in a region in the proximity of the connecting layer 51 in the portion 50 of the aircraft component 32 is a non-woven metallic mesh 53 for generating the induction heat. In other embodiments the induction heat-generating means, that is to say for example the non-woven metallic mesh, can also be arranged in the connecting layer 51 or in the portion 52 of the holder. If the aircraft component 32 and/or the holder 33 already has induction heat-generating means, for example metals, an additional induction heat-generating means in the aircraft component 32, the connecting layer 51 or the holder 33 is not necessary.

If carbon fibers of the first material and/or the second material, in particular of the fiber composite material of the aircraft component or the holder, are used as induction heat-generating means, the connecting region preferably does not have a non-woven metallic mesh. Therefore, in a corresponding view, the broken line 53 would be omitted in that situation in FIG. 6.

FIG. 7 shows a diagrammatic view of a non-woven metallic mesh which has been produced by stretching and slitting a metal sheet.

In contrast to a woven metallic mesh that non-woven metallic mesh does not have any contact locations in respect of individual threads, which could cause a resistance to be overcome by induction currents. Therefore, an induction heat which is adequate to activate the adhesive material can be easily generated by the non-woven metallic mesh.

FIG. 8 is a diagrammatic view of the holder 33. In this embodiment the holder 33 includes a disk-shaped fixing portion 34 which is connected to the aircraft component, and a holding element 35. The fixing portion 34 and the holding element 35 have a polyamide-PA66 proportion of 70 percent and a glass fiber proportion of 30 percent. The holding element 35 serves to hold an object, such as for example an electric line or heavier articles. In this embodiment the thickness of the fixing portion is 2.2 mm and the diameter of the fixing portion is 24 mm. In other embodiments, the holder can also be of the configuration as diagrammatically shown in FIGS. 1 through 3. The holder can therefore also have a first elongate right-angled or cylindrical portion which is preferably connected to the inductor 2 during the connecting operation, and a conical or plate-shaped second portion connected to a second material, in particular a material of an aircraft component. The first material and the second material can also be of other desired shapes.

In this embodiment the aircraft component is an overhead locker or a part of an overhead locker. In other embodiments the aircraft component can also be any other desired aircraft component, in particular a side cladding in an aircraft.

Preferably layer structures of a carbon fiber-reinforced plastic material are used as the first material and/or the second material, in which case induction heat can be generated in those layer structures.

Preferred layer structures of a carbon fibre-reinforced plastic material are preferably layer structures in which the carbon fibers in the respective layer are unidirectionally oriented and carbon fibers of at least two adjacent layers are not arranged in mutually parallel relationship so that carbon fibers of adjacent layers form intersection points. In layer structures with such intersection points induction heat adequate to activate the adhesive material can be generated. Such a layer structure which represents a multi-axial non-crimp fabric is shown by way of example in FIG. 9. It will also be seen from FIG. 9 that the layer structure is preferably of a symmetrical configuration with respect to a central plane of symmetry and with respect to the orientations of the carbon fibers in the individual layers. That has the advantage that stresses within the layer structure are reduced or eliminated.

A further preferred layer structure of a carbon fiber-reinforced plastic has a plurality of layers, wherein a woven fabric produced from carbon fibers is provided in at least some layers and preferably in all layers. An example of such a layer structure is diagrammatically shown in FIG. 10.

In a further preferred embodiment the individual layers of carbon fiber-reinforced plastic, for example the layers shown in FIGS. 9 and 10, as illustrated by way of example in FIG. 11, are sewn in a direction perpendicular to the planes in which the layer structures are arranged (Z-direction) to carbon fibers, in particular by a C-fiber roving.

The layer structures can be used alone or also together with a further induction heat-generating means such as for example a metallic means, in particular a non-woven metallic mesh.

Although a non-woven metallic mesh has been used in the above-described embodiment as the induction heat-generating means in other embodiments, besides the non-woven metallic mesh and/or the carbon fibers operating as induction heat-generating means, it is also possible to use a woven metallic mesh as the induction heat-generating means, which in particular is produced by weaving metal threads.

If carbon fibers are used as the induction heat-generating means those carbon fibers preferably have at least two functions. On the one hand they influence the physical properties of the respective material and on the other hand they serve as induction heat-generating means.

What is claimed is:

1. A method of connecting a first material to a second material by means of a heat-activatable adhesive material in aircraft construction, wherein the adhesive material is arranged between the first material and the second material and an induction heat which is adequate to activate the adhesive material is generated using an induction heat-generating means, wherein the first material and/or the second material have the induction heat-generating means, wherein the induction heat-generating means is or has an amount of carbon fibers, and wherein the induction heat is generated by medium-frequency radiation.

2. A method according to claim 1 characterised in that besides the carbon fibers of the carbon fiber-reinforced plastic material no further induction heat-generating means is used for generating the induction heat.

3. A method according to claim 1 characterised in that the first material and/or the second material have at least one material from the group consisting of plastic materials, in particular thermoplastic materials, fiber composite plastics, in particular carbon fiber-reinforced plastics and glass fiber-reinforced plastics, metals and fiber metal laminates.

4. A method according to claim 1 characterised in that
   a) the first material is a constituent part of a fixing element or the fixing element comprises the first material, and
   b) the second material is a constituent part of an aircraft component or the aircraft component comprises the second material,
   so that the first material of the fixing element is connected to the second material of the aircraft component to connect the fixing element to the aircraft component.

5. A method as set forth in claim 1 characterised in that at least one of the first material and the second material comprises a carbon fiber-reinforced plastic in a layer structure, wherein the layer structure has a plurality of layers with the carbon fibers and the carbon fibers of the carbon fiber-reinforced plastic are the induction heat-generating means.

6. A method as set forth in claim 5 characterised in that the carbon fibers in at least some layers are unidirectionally oriented, wherein the carbon fibers of at least two adjacent layers are not arranged in parallel relationship so that the carbon fibers of the at least two adjacent layers have intersection points.

7. A method according to claim 5 characterised in that the carbon fibers in at least one layer form a woven fabric.

8. A method according to claim 5 characterised in that the orientation of the carbon fibers in the layers is symmetrical with respect to a plane of symmetry which is arranged parallel to the layers and in relation to a direction perpendicular to the layers centrally in the layer structure.

9. A method according to claim 5 characterised in that the layers are sewn by means of carbon fibers.

10. A method as set forth in claim 9 characterised in that the layers are sewn by means of carbon fibers in a direction perpendicular to the planes in which the layers are arranged.

* * * * *